Patented July 8, 1952

2,602,800

UNITED STATES PATENT OFFICE 2,602,800

RECOVERY OF PHTHALOCYANINE COLORING MATTERS

George Barnhart, Newark, Del., assignor to E. I. du Pont de Nemours & Company, Wilmington, Del., a corporation of Delaware No Drawing. Application April 14, 1949, Serial No. 87,569

4 Claims. (Cl. 260—314.5)

This invention relates to the preparation and isolation of metal phthalocyanines. More particularly, this invention is concerned with the process of recovering copper-phthalocyanine or other metal-phthalocyanines from their reaction mass when prepared by the urea-process in the presence of solvents.

The fundamentals of the urea-process of preparing metal phthalocyanines are set forth in U. S. Patent Nos. 2,197,458 and 2,214,477. It consists essentially of heating a phthalocyanine-yielding organic intermediate, for instance phthalimide, phthalic anhydride, chlorinated phthalic anhydride, or mixtures of any of these, with a sufficient quantity of urea to form a liquid melt, in the presence of boric acid and molybdenum compounds or other ancillary agents as defined in the second of the aforementioned patents. In this process as described in the above patents, the reaction mass eventually sets into a solid mass, and the color is recovered from this mass by various extraction procedures, involving mechanical grinding to a powder and successive treatments with aqueous alkali, aqueous hydrochloric acid, and concentrated sulfuric acid followed by drowning in water.

Subsequent developments of the urea-process found it desirable to add to the reaction mass an inert, high-boiling, water immiscible organic liquid such as trichlorobenzene or kerosene. The presence of the inert liquid keeps the reaction mass fluid throughout the reaction, facilitates handling of the same at all stages, and obviates the need of mechanical treatments such as crushing and grinding in the recovery of their color.

The use of such inert diluents, however, instantly introduces the two-fold problem of separating the resulting pigment from (a) the solvent and (b) the attendant by-products and impurities. Although the inert liquids mentioned do not exert any solvent action on the color produced, they nevertheless adhere to it tenaciously so that separation by steam distillation is impractical. Likewise, separation of the color from the impurities has not been achieved efficiently heretofore, with the result that the pigment ultimately recovered was relatively dull in shade.

It is accordingly an object of this invention to provide a commercially practicable process for effecting the aforegoing separation in an efficient manner, producing a high grade pigment. Further important objects of this invention will appear as the description proceeds.

Now, in accordance with this invention, separation of the color in the "urea-solvent process" hereinabove described from both solvent and impurities is achieved neatly and economically by treating the fluid reaction mass with concentrated sulfuric acid in limited quantity, to effect transformation of both pigment and impurities into sulfated products, without however dissolving any appreciable quantities of either of them. Thereupon, the supernatant liquid is removed, and the solid residue is treated with water to dissolve out the impurities and to regenerate the pigment, in solid form, from its sulfate.

By concentrated sulfuric acid, I mean $H_2SO_4$ of 85 to 100% strength, but the quantity thereof should be calculated to supply from 1.0 to 1.5 parts by weight of $H_2SO_4$ for each part of estimated pigment in the reaction mass. I find that this quantity is rather critical; lesser quantities do not water-solubilize all the impurities; larger quantities, up to about 8 to 10 parts by weight, transform the solid residue into a tarry mass which is difficult to handle and to separate into its constituents. Quantities of $H_2SO_4$ of from 8 to 10 parts by weight or higher (per part of pigment) will dissolve the entire mass, permitting the separation from there on to proceed by old methods. (See for instance, Example 3 of Gross, U. S. P. 2,365,464 or Detrick and Diver, U. S. P. 2,284,685.) But I am not concerned with such complete-solution processes in this application. It will be noted, incidentally, that the solvents above mentioned are essentially immiscible with concentrated sulfuric acid.

The temperature of treatment with sulfuric acid according to this invention should be preferably 90° C. or higher, even up to 150° C.

In this treatment, practically all of the $H_2SO_4$ added is consumed. Part of it goes to transform the pigment, say copper-phthalocyanine, into its tetrasulfate, and part of it goes to convert the by-products and impurities into a water-soluble form, perhaps by sulfation or sulfonation. Consequently, the quantity of liquid in the reaction mass remains substantially unchanged, and no $H_2SO_4$ is left over in the mixture to dissolve any substantial quantities of the metal-phthalocyanine tetrasulfate.

Separation of the inert liquid from the sulfated solids may then be effected in any convenient manner, for instance decantation or filtration, which may or may not be followed by washing with a water-soluble organic liquid, for instance an alcohol. When the residual mass is now treated with water, the converted impurities are dissolved but not the color. Instead, the latter undergoes transformation (in solid state) from, say, copper-phthalocyanine tetrasulfate into copper-phthalocyanine. The latter may then be recovered directly by filtration; or, if desired, the aqueous mass may first be subjected to steam distillation to remove any traces of the adhering inert organic liquid and then filtered.

Without limiting my invention, the following examples are given to illustrate my preferred mode of operation. Parts mentioned are by weight.

Example 1

To the reaction mass obtained by the reaction of 1 part of phthalic anhydride, 0.23 part of cupric chloride, 1.5 parts of urea, 0.025 part of boric acid and 0.0025 part of ammonium molybdate in 4 parts of trichlorobenzene, is slowly added with agitation at a temperature of 140° to 150° C., 1.2 parts of 98% $H_2SO_4$. The agitation at 150° C. is continued for 2 hours. The very granular precipitate, consisting of copper-phthalocyanine tetrasulfate and sulfated by-products, is filtered off and washed with 2 parts of isopropanol. The filter cake is slurried in 5 parts of water, neutralized with caustic soda, filtered and dried. An unfinished pigment of high purity and relatively small particle size is obtained. It may be finished by any of the well-known methods.

Example 2

The copper-phthalocyanine reaction mass prepared as in Example 1, is treated with sulfuric acid in the same way. The charge is filtered, the filter cake, unwashed, is slurried in 5 parts of water, neutralized with caustic soda and the residual trichlorobenzene removed by steam distillation. The pigment is filtered off and dried. A product high in purity and relatively small particle size is obtained.

It will be clear that by proceeding according to this invention the recovery of copper-phthalocyanine from the reaction mass obtained in the urea-solvent process of synthesis, is reduced to a very simple procedure avoiding the need of isolating the color in dry form prior to treatment with sulfuric acid, and likewise avoiding the need of crushing or grinding a solid reaction mass, and the need of carrying out auxiliary purification treatments such as extraction with dilute alkali and dilute acid.

While the above examples name specifically copper-phthalocyanine, the procedure is obviously applicable to any phthalocyanine color which is producible by the urea-process and which can be treated with strong sulfuric acid without losing its metal. Consequently, this method is applicable to metal phthalocyanines whose metal is iron, nickel, cobalt, aluminum, chromium and copper.

Furthermore, taking again the case of copper-phthalocyanine as an illustration, chlorinated copper-phthalocyanine of any desired average chlorine content may be produced by the urea-process, by employing as initial organic intermediate a mixture of say phthalic anhydride with monochloro-phthalic or dichloro-phthalic anhydride. My novel method of isolation is obviously applicable to such partially chlorinated products as well.

I claim as my invention:

1. In the urea-process of preparing a copper-phthalocyanine, wherein phthalocyanine-forming organic intermediates are reacted with copper yielding agents in the presence of urea and an organic solvent selected from the group consisting of trichlorobenzene and kerosene, the improvement which consists of isolating the produced pigment by agitating the entire reaction mass with sulfuric acid of 85 to 100% strength, in quantity calculated to supply not less than 1.0 and not more than 1.5 parts by weight of $H_2SO_4$ for each part of pigment produced, and at a temperature between 90° and 150° C., whereby to convert the pigment into its tetrasulfate in solid form and simultaneously to convert the by-products of the reaction mass into a form soluble in dilute acid, then separating the bulk of the liquid phase and treating the residual mass with water, whereby to liberate the pigment in solid form from its tetrasulfate while dissolving the converted impurities, enabling separation between the two.

2. The process of claim 1, including further the step of filtering the water-treated solid mass, to recover the liberated pigment.

3. The process of claim 1, wherein the water-treated solid mass is first steam distilled to remove the residual organic liquid, and the resultant aqueous mass is filtered to remove the liberated solid pigment.

4. In the process of recovering copper phthalocyanine from its reaction mass wherein said compound is contaminated with a water-insoluble organic solvent which is immiscible with sulfuric acid, and with residual and by-product impurities from the reaction, the step which consists of treating said reaction mass with sulfuric acid of 85 to 100% strength, in quantity corresponding in $H_2SO_4$ content to not less than 1.0 and not more than 1.5 times the weight of copper phthalocyanine in said reaction mass, and at a temperature between 90° and 150° C., whereby to convert the pigment into a tetrasulfate in solid state, while converting the by-product impurities into a form soluble in dilute acid.

GEORGE BARNHART.

REFERENCES CITED

The following references are of record in the file of this patent:

UNITED STATES PATENTS

| Number | Name | Date |
|---|---|---|
| 2,284,685 | Detrick et al. | June 2, 1942 |
| 2,365,464 | Gross | Dec. 19, 1944 |
| 2,524,672 | Lecher | Oct. 3, 1950 |

FOREIGN PATENTS

| Number | Country | Date |
|---|---|---|
| 502,623 | Great Britain | Mar. 22, 1939 |